US012711858B2

(12) United States Patent
Sauer

(10) Patent No.: US 12,711,858 B2
(45) Date of Patent: Aug. 18, 2026

(54) EMERGENCY PASSAGE SYSTEM FOR NOTIFICATION OF APPROACHING EMERGENCY VEHICLES

(71) Applicant: SAUERCONCEPT PATENT APS, Fredensborg (DK)

(72) Inventor: Steen Sauer, Fredensborg (DK)

(73) Assignee: SAUERCONCEPT PATENT APS, Fredensborg (DK)

( * ) Notice: Subject to any disclaimer, the term of this patent is extended or adjusted under 35 U.S.C. 154(b) by 133 days.

(21) Appl. No.: 18/287,360

(22) PCT Filed: Feb. 21, 2022

(86) PCT No.: PCT/EP2022/054227
§ 371 (c)(1),
(2) Date: Oct. 18, 2023

(87) PCT Pub. No.: WO2022/175517
PCT Pub. Date: Aug. 25, 2022

(65) Prior Publication Data

US 2024/0203250 A1 Jun. 20, 2024

(30) Foreign Application Priority Data

Feb. 19, 2021 (EP) .................................... 21158143

(51) Int. Cl.

| | |
|---|---|
| ***G08G 1/087*** | (2006.01) |
| ***G08B 5/36*** | (2006.01) |
| ***H04B 1/10*** | (2006.01) |

(52) U.S. Cl.
CPC .................................... *G08G 1/087* (2013.01)

(58) Field of Classification Search
None
See application file for complete search history.

(56) References Cited

U.S. PATENT DOCUMENTS 4,228,419 A * 10/1980 Anderson .............. G08G 1/087 455/99
6,940,422 B1 9/2005 Bachelder et al.
(Continued)

FOREIGN PATENT DOCUMENTS

WO WO 2021/007582 A1 1/2021

OTHER PUBLICATIONS

International Patent Application No. PCT/EP2022/054227 International Search Report and Written Opinion dated Jun. 15, 2022, 9 pages.
(Continued)

*Primary Examiner* — John F Mortell
(74) *Attorney, Agent, or Firm* — Cozen O'Connor

(57) ABSTRACT

An emergency passage system facilitates movement of an emergency vehicle through traffic such that the emergency vehicle may arrive at a destination more quickly. The system includes a plurality of visual warning devices located along roads and/or at intersections, and a plurality of wireless communications modules. Each wireless communications module is connected to a respective visual warning device, and each wireless communications module has a directivity and a signal threshold defining an activation zone such that when the emergency vehicle enters an activation zone of a respective wireless communications module, the visual warning device connected to said respective wireless communications module displays a first visual warning.

15 Claims, 2 Drawing Sheets

(56) References Cited

U.S. PATENT DOCUMENTS

| | | | | |
|---|---|---|---|---|
| 2004/0203395 | A1* | 10/2004 | Chizhik | H04B 7/01 455/63.1 |
| 2013/0027221 | A1 | 1/2013 | Johnson | |
| 2014/0210643 | A1 | 7/2014 | Baker | |
| 2020/0126412 | A1* | 4/2020 | James | G08B 5/36 |

OTHER PUBLICATIONS

European Patent Application No. 21 15 8143 European Search Report dated Jun. 30, 2021, 2 pages.

* cited by examiner

EMERGENCY PASSAGE SYSTEM FOR NOTIFICATION OF APPROACHING EMERGENCY VEHICLES

CROSS-REFERENCE TO RELATED APPLICATIONS

This application is a US National phase Application of International Patent Application No. PCT/EP2022/054227 filed Feb. 21, 2022, which claims priority to EP 21158143.4 filed Feb. 19, 2021, both of which are hereby incorporated in their entireties.

BACKGROUND

The present invention relates to an emergency passage system. An example of such a system is disclosed in U.S. Pat. No. 9,934,685.

Emergency passage systems control the flow of traffic when a priority vehicle such as an ambulance is approaching. This typically involves controlling traffic lights stop vehicles in some directions and provide safe and fast passage of the priority vehicle.

SUMMARY

It is an object of the present disclosure to provide a stand-alone system, which functions independently from GPS, and is not dependent on any other connections to a central system. The stand-alone system may send information to a central server, but it is not a requirement.

Such a stand-alone system may provide a more fail-safe system, and simpler system to implement in an existing infrastructure.

The above object and advantages together with numerous other objects and advantages, which will be evident from the description of the present invention, are according to a first aspect of the present invention obtained by:

An emergency passage system for notification of an approaching emergency vehicle, said emergency passage system comprising:

- a plurality of visual warning devices including a first visual warning device and a second visual warning device for facilitating movement of said emergency vehicle through traffic, said plurality of visual warning devices located along roads and/or at intersections,
- a plurality of wireless communications modules including a first wireless communications module and a second wireless communications module, each wireless communications module connected to a respective visual warning device, each wireless communications module having a directivity and a signal threshold defining an activation zone such that when said emergency vehicle entering an activation zone of a respective wireless communications module, the visual warning device connected to said respective wireless communications module displaying a first visual warning.

AN EXAMPLE

A city may have three intersections. The traffic load at two of the intersections may be much higher than the traffic load at the third. For such a city or infrastructure, the emergency passage system may be constituted by a first visual warning device and a first wireless communications module at the first heavy loaded intersection, and a second visual warning device and a second wireless communications module at the second heavy loaded intersection.

ANOTHER EXAMPLE

A city may have three intersections. All three intersections may have a high traffic load, but two of them may be close to each other. For such a city or infrastructure, the emergency passage system may be constituted by a first visual warning device and a first wireless communications module at the first intersection, and a second visual warning device at the second intersection and a third visual warning device at the third intersection. The second and third visual warning device may be controlled by one wireless communications module.

Thus, a given infrastructure may comprise a plurality of intersections, and all or at least some of these intersections may comprise a system having a wireless communications module and a visual warning device. The system may also have at least one central processing unit controlling the wireless communications module and the visual warning device. The system at an intersection may be battery and/or solar powered. It may comprise means for communication to a central server for surveillance of the system, for example via a sim card.

If the battery is running low or an otherwise defect is detected, it may be communicated to the central server such that the defect may be fixed.

DETAILED DESCRIPTION

Figure 1:
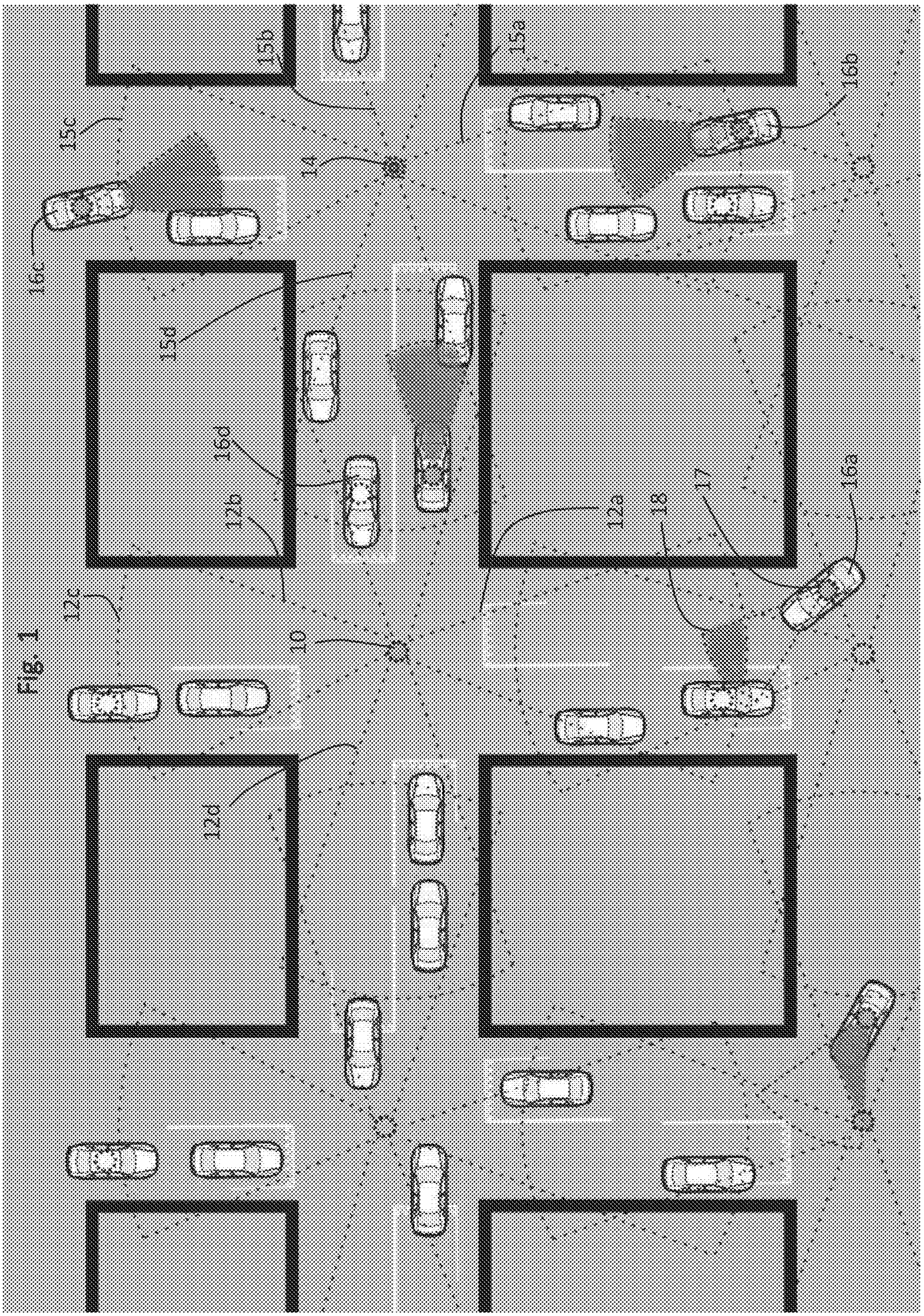
FIG. 1 shows an overview of a traffic situation in which an emergency passaqe system is arranged to facilitate movement of an emergency vehicle through traffic, in embodiments.

The invention will now be explained in more detail below by means of examples with reference to the accompanying drawings.

The invention may, however, be embodied in different forms than depicted below, and should not be construed as limited to any examples set forth herein. Rather, any examples are provided so that the disclosure will be thorough and complete, and will fully convey the scope of the invention to those skilled in the art. Like reference numerals refer to like elements throughout. Like elements will, thus, not be described in detail with respect to the description of each figure. A detailed description of embodiments of an electrolysis stack as well as embodiments of a buffer container will be described.

FIG. 1 shows an overview of a traffic situation in which an emergency passage system is arranged to facilitate movement of an emergency vehicle through traffic.

In this way, the emergency vehicle may arrive sooner at a scene of an accident or arrive sooner at a hospital for example.

The emergency vehicle may be an ambulance, a police car or fire truck a tow truck for example.

The overview shows six intersections.

A visual warning device is arranged at each intersection, i.e. six visual warning devices are illustrated. Each visual warning device is illustrated as a dotted circle. A first visual warning device 10 is arranged in a first intersection, i.e.

arranged at the center of the first intersection. Six vehicles are approaching the first intersection.

The first intersection may have a traffic light for regulating the flow of traffic through the first intersection, such that cars on the first road of the first intersection have a green light, and the cars on the other road of the first intersection have a red light.

Each visual warning device is connected to a wireless communications module, i.e. the first visual warning device is connected to a first wireless communications module.

The first wireless communications module may be arranged together with the first visual warning device or at a corner of the intersection.

The connection between the first wireless communications module and the first visual warning device may be wired or wireless.

Each wireless communications module has a directivity and a signal threshold defining an activation zone, i.e. the first wireless communications module defines a first activation zone 12.

There may be one wireless communications module at each intersection defining a plurality of activation zones or there may be a plurality of wireless communication modules at each intersection defining a plurality of activation zones. For example, a four-way intersection such as the first intersection in FIG. 1 is to have an activation zone for each of the four-road segment. This may be achieved with a wireless communications module with four directional antennas. A three-way intersection may have a wireless communications module with three directional antennas.

As an alternative, the wireless communications module of the emergency vehicle in an emergency state may define an activation zone, i.e. as the emergency vehicle moves through traffic and a wireless communication module at an intersection is within the activation zone of the emergency vehicle, the visual warning device is switched on.

The wireless communication module of the emergency vehicle may be arranged to transmit a wireless signal in the direction of travel, for example by means of a directive antenna.

The wireless communications module may transmit with a signal strength such that it may travel a distance corresponding to the average distance between intersections of the city and be detected by a wireless communication module of an intersection.

This may result in that sometimes two successive visual warnings devices along the road that the emergency vehicle travels will be switched on at the same time, which may be less efficient for the overall traffic flow compared to a system where the wireless communications module at an intersection defines the activation zones for that intersection.

In FIG. 1, the first wireless communications module defines four activations zones (12*a*, 12*b*, 12*c*, 12*d*) for example by means of up to four antennas.

The activation zone is for detecting an approaching emergency vehicle—when an emergency vehicle is inside the activation zone, a wireless signal transmitted from the emergency vehicle may be detected. When an approaching emergency vehicle has been detected, the first visual warning device 10 displays a first visual warning, for example a blue light.

The first wireless communications module may have a directional antenna that may be adjusted to a first direction, for example down the road of one of the roads of the intersection, i.e. the directivity may be adjusted to an angle range within 0 to 120 degrees depending on the course of the road, for example if it is a an one lane road or a two lane road.

Thus, the gain of the first wireless communications module may be such that a signal from outside the angle range is noise and is not registered as a signal from an emergency vehicle.

The signal threshold of the first wireless communications module may be adjusted for example in dependance on the distance to the next intersection, i.e. such that a signal from a greater distance is noise and is not registered as a signal from an emergency vehicle. In this way, only a relevant visual warning device is activated, and the traffic at other intersections is not disrupted.

It is contemplated that a wireless signal transmitted from the emergency vehicle may be transmitted at a fixed signal level. The strength of the electric field associated with the first wireless communications module (either in transmission mode or receiving mode) decreases with distance to the first wireless communications module, for example approximated by the function 1/d, where d is the distance to the first wireless communications module.

The amplification by the first wireless communications module may then be set as a function of the signal level of the wireless signal from the emergency vehicle, and the distance between two intersections, such that when the emergency vehicle enters the zone between two intersections, i.e. the activation zone defined by the first wireless communications module, the wireless signal transmitted by the emergency vehicle is detected (even at the far end of the activation zone).

Thus, a signal from too far away will arrive having a signal strength lower than the signal threshold of the wireless communications module.

For example, the emergency vehicle emits a wireless signal at 4 dB. The distance to the wireless communications module at an intersection is so that the signal is attenuated 3 dB. Thus, at the wireless communication module, the signal is 1 dB. The signal threshold of the wireless communication module is 2 dB. This means that the signal is not accepted, but rejected.

The wireless signal transmitted by the emergency vehicle may be coded.

A second visual warning device 14 is arranged at a second intersection. The second visual warning device is connected to a second wireless communications module.

Defined at the second intersection are four activations zones (15*a*, 15*b*, 15*c*, 15*d*).

In FIG. 1, a first emergency vehicle 16*a* has entered the first activation zone 12*a*.

The first emergency vehicle has a third visual warning device 17 displaying a blue light meaning that the first emergency vehicle is on route to an emergency.

The first emergency vehicle has a third wireless communications module, which may be arranged to transmit a wireless signal for example by means of an antenna. FIG. 1 illustrates a radiation pattern 18 of the antenna.

The third wireless communications module may be activated/switched on when the third visual warning device is switched on.

The first wireless communications module may transmit a first wireless signal. The first wireless signal may be received by the third wireless communications module, because the third wireless communications module is on.

The third wireless communications module may send a second wireless signal back to the first wireless communications module, and thereby switch on the first visual warning device.

Alternatively, the third wireless communications module transmits a wireless signal continuously or in time intervals, and when the first emergency vehicle is within the first activation zone, the wireless signal is received by the first wireless communications module.

Since the first emergency vehicle is in an emergency state (its visual warning device is on), and the first emergency vehicle has entered the first activation zone, the first visual warning device displays a visual warning (a blue light).

For the second intersection, a second emergency vehicle 16*b* has entered the activation zone 15*a* defined by the second wireless communication module 14. The visual warning device of the second emergency vehicle is on. Thus, the second wireless communications module registers that an emergency vehicle in an emergency state is within one of its activation zones. At the same time, a third emergency vehicle 16*c* is inside the activation zone 15*d* of the second wireless communications module. The third emergency vehicle being in an emergency state. Thus, two emergency vehicles in emergency states are approaching the same intersection.

When two or more emergency vehicles are detected for the same intersection, the visual warning device of that intersection displays another visual warning than the first visual warning. In FIG. 1 it is illustrated that the second visual warning device displays a red light.

A third emergency vehicle 16*c* is in the activation zone 15*c*.

When an emergency vehicle (such as the emergency vehicle 16*d*) is inside an activation zone (such as the activation zone 12*b* of the first wireless communications module), and the emergency vehicle is not in an emergency state, it is not detected—for example because the wireless communication module of that emergency vehicle is not switched on.

Figure 2:
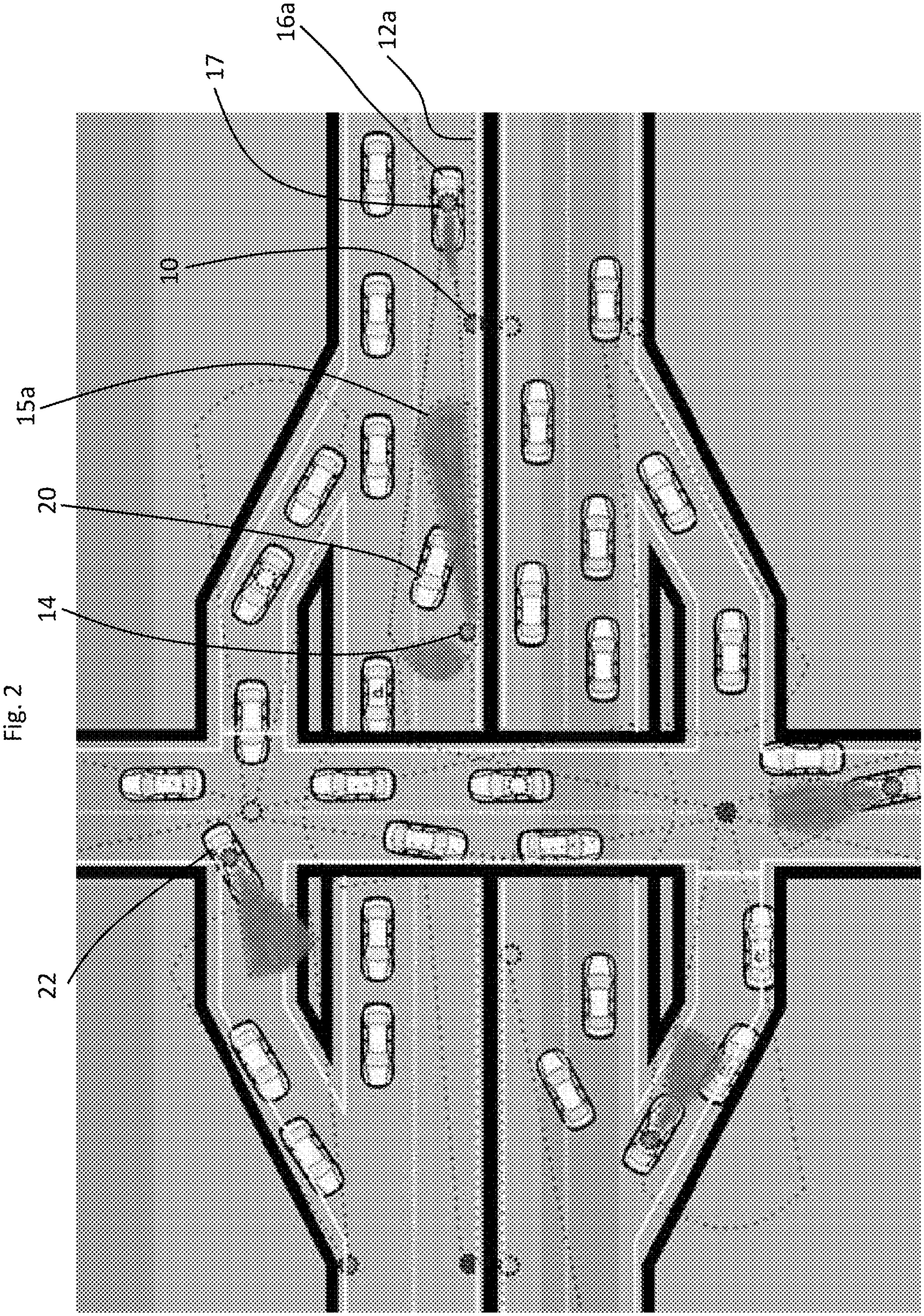
FIG. 2 shows a highway situation including two intersections on a bridge across the highway, in embodiments.

FIG. 2 shows a highway situation including two intersections on a bridge across the highway.

The flow of traffic for the two intersections on the bridge may be regulated using an emergency passage system as described in connection with FIG. 1.

For the highway, the emergency passage system may also be used to regulate the flow of traffic on the highway.

Along the highway in each direction, visual warning devices are arranged, such as a first visual warning device 10 and a second visual warning device 14. The first visual warning device is connected to a first wireless communication module. The second visual warning device is connected to a second wireless communication module. The first wireless communication module defines a first activation zone 12*a* and the second wireless communication module defines an activation zone 15*a*.

One wireless communication module could be used by (connected to) more than one visual warning device, i.e. when an emergency vehicle is detected by the wireless communication module, the wireless communication module can activate (switch on) successive visual warning devices depending on the velocity of the emergency vehicle.

The visual warning devices are spaced a distance. The spacing is a balance between providing an efficient traffic low and facilitating movement of an emergency vehicle.

A large distance between the visual warning devices means that there is a lower chance of the traffic on the highway becomes aware of an approaching emergency vehicle, but the traffic is cleared more efficient.

A short distance between the visual warning devices means that there is a higher chance of the traffic on the highway becomes aware of an approaching emergency vehicle, but the traffic is cleared less efficient.

A typical distance could be for example between 100 m to 2000 m, such as 300 to 1000 m.

In FIG. 2, the distance between the first visual warning device and the second visual warning device is so that as the emergency vehicle 16*a*, which is in an emergency state, transmits a wireless signal detected by both the first wireless communication module and the second wireless communication module. Meaning that the first visual warning device and the second visual warning device display a visual warning (in the form of a blue light).

FIG. 2 shows that a car 20 is clearing the road for the emergency vehicle by pulling to the right side of the road.

The emergency vehicle 16*a* has a third visual warning device 17.

A fourth visual warning device 19 is located at an entry to the highway. The entry may be regulated similar to the regulation of an intersection.

The wireless communication module connected to the fourth visual warning may define an activation zone that also includes the entry. In this case, a second emergency vehicle 22 in an emergency state is entering the highway.

At the same time, the wireless communication module connected to the fourth visual warning detects the first emergency vehicle approaching. Thus, two emergency vehicles are detected, and the fourth visual warning device display a visual warning in the form of a red light.

Now follows a set of points, which constitute aspects of the present invention which may be considered independently patentable and as such, the following sets form basis for possible future sets of claims:

1. An emergency passage system for notification of an approaching emergency vehicle, said emergency passage system comprising:
   - a plurality of visual warning devices including a first visual warning device and a second visual warning device for facilitating movement of said emergency vehicle through traffic, said plurality of visual warning devices located along roads and/or at intersections,
   - a plurality of wireless communications modules including a first wireless communications module and a second wireless communications module,
   - each wireless communications module connected to a respective visual warning device,
   - each wireless communications module having a directivity and a signal threshold defining an activation zone such that when said emergency vehicle entering an activation zone of a respective wireless communications module, the visual warning device connected to said respective wireless communications module displaying a first visual warning.
2. The emergency passage system according to any of the preceding points, comprising said emergency vehicle.
3. The emergency passage system according to any of the preceding points, said emergency vehicle comprising a third wireless communications module for transmitting a wireless signal.
4. The emergency passage system according to any of the preceding points, each wireless communications module having a higher gain in said activation zone than outside said activation area.

5. The emergency passage system according to any of the preceding points, each wireless communications module comprising a directional antenna.
6. The emergency passage system according to any of the preceding points, at least a part of said wireless communications modules comprising more than one directional antenna.
7. The emergency passage system according to any of the preceding points, said directivity defining a range of angles for transmitting and/or receiving a wireless signal within said range of angles.
8. The emergency passage system according to any of the preceding points, said directivity being adjustable.
9. The emergency passage system according to any of the preceding points, said signal threshold defining a range for transmitting and/or receiving a wireless signal within said range.
10. The emergency passage system according to any of the preceding points, said range being adjustable.
11. The emergency passage system according to any of the preceding points, each wireless communications module arranged at a respective visual warning device.
12. The emergency passage system according to any of the preceding points, said first visual warning device and said second visual warning device being spaced a distance, said first wireless communications module defining a respective activation zone such having a respective signal threshold such that signals from a distance greater than said spaced distance constituting noise.
13. The emergency passage system according to any of the preceding points, comprising a second emergency vehicle having a fourth wireless communications module for transmitting a second wireless signal.
14. The emergency passage system according to any of the preceding points, said first visual warning device displaying a first visual warning when receiving said first wireless signal.
15. The emergency passage system according to any of the preceding points, said first visual warning device displaying a second visual warning when receiving said first wireless signal and said second wireless signal.
16. An emergency passage system for notification of an approaching emergency vehicle, said emergency passage system comprising:
   said emergency vehicle,
   a plurality of visual warning devices including a first visual warning device and a second visual warning device for facilitating movement of said emergency vehicle through traffic, said plurality of visual warning devices located along roads and/or at intersections,
   a third visual warning device arranged at said emergency vehicle,
   a plurality of wireless communications modules including a first wireless communications module and a second wireless communications module,
   a third wireless communications module arranged at said emergency vehicle, said third wireless communications module having a directivity defining an activation zone such that when a respective visual warning device of said plurality of visual warning devices being within said activation zone, said respective visual warning device displaying a first visual warning.
17. The emergency passage system according to any of the preceding points, said third wireless communications module transmitting a wireless signal in the direction of travel of said emergency vehicle.

The invention claimed is:

1. An emergency passage system for notification of an approaching emergency vehicle, said emergency passage system comprising:

a plurality of visual warning devices including a first visual warning device and a second visual warning device for facilitating movement of said emergency vehicle through traffic, said plurality of visual warning devices located along roads and/or at intersections, a plurality of wireless communications modules including a first wireless communications module and a second wireless communications module, each wireless communications module comprising:

a directional antenna adjusted to a predefined direction of travel; and a processing unit configured to compare a received signal level to a signal threshold and to control a connected visual warning device based on the comparison;

each wireless communications module being connected to a respective visual warning device, each wireless communications module having a directivity and a signal threshold defining an activation zone having a range of angles for transmitting and receiving a wireless signal within said range of angles, wherein the visual warning device connected to a respective wireless communications module is activated when the respective wireless communications module receives a transmission signal from the emergency vehicle in response to the wireless signal transmitted by the wireless communications module.

2. The emergency passage system according to claim 1, comprising said emergency vehicle.

3. The emergency passage system according to claim 2, said emergency vehicle comprising a third wireless communications module for transmitting a first wireless signal.

4. The emergency passage system according to claim 1, each wireless communications module having a higher gain in said activation zone than outside said activation zone.

5. The emergency passage system according to claim 1, at least a part of said plurality of wireless communications modules comprising more than one directional antenna.

6. The emergency passage system according to claim 1, said signal threshold defining a range for transmitting and/or receiving a wireless signal within said range.

7. The emergency passage system according to claim 6, said range being adjustable.

8. The emergency passage system according to claim 1, each of said plurality of wireless communications modules arranged at a respective visual warning device.

9. The emergency passage system according to claim 1, said first visual warning device and said second visual warning device being spaced a distance, said first wireless communications module defining a respective activation zone such having a respective signal threshold such that signals from a distance greater than said spaced distance constitute noise.

10. The emergency passage system according to claim 3, comprising a second emergency vehicle having a fourth wireless communications module for transmitting a second wireless signal.

11. The emergency passage system according to claim 10, said first visual warning device displaying a first visual warning when receiving said first wireless signal.

12. The emergency passage system according to claim 11, said first visual warning device displaying a second visual warning when receiving said first wireless signal and said second wireless signal.

13. The emergency passage system according to claim 1, wherein the signal threshold is adjustable.

14. The emergency passage system according to claim 13, wherein the signal threshold is adjustable based on a distance between intersections.

15. The emergency passage system according to claim 1, wherein the activation zone is adjustable to limit detection to the respective road.

* * * * *